(No Model.)
W. BIRCH.
FILTER.
No. 461,232. Patented Oct. 13, 1891.
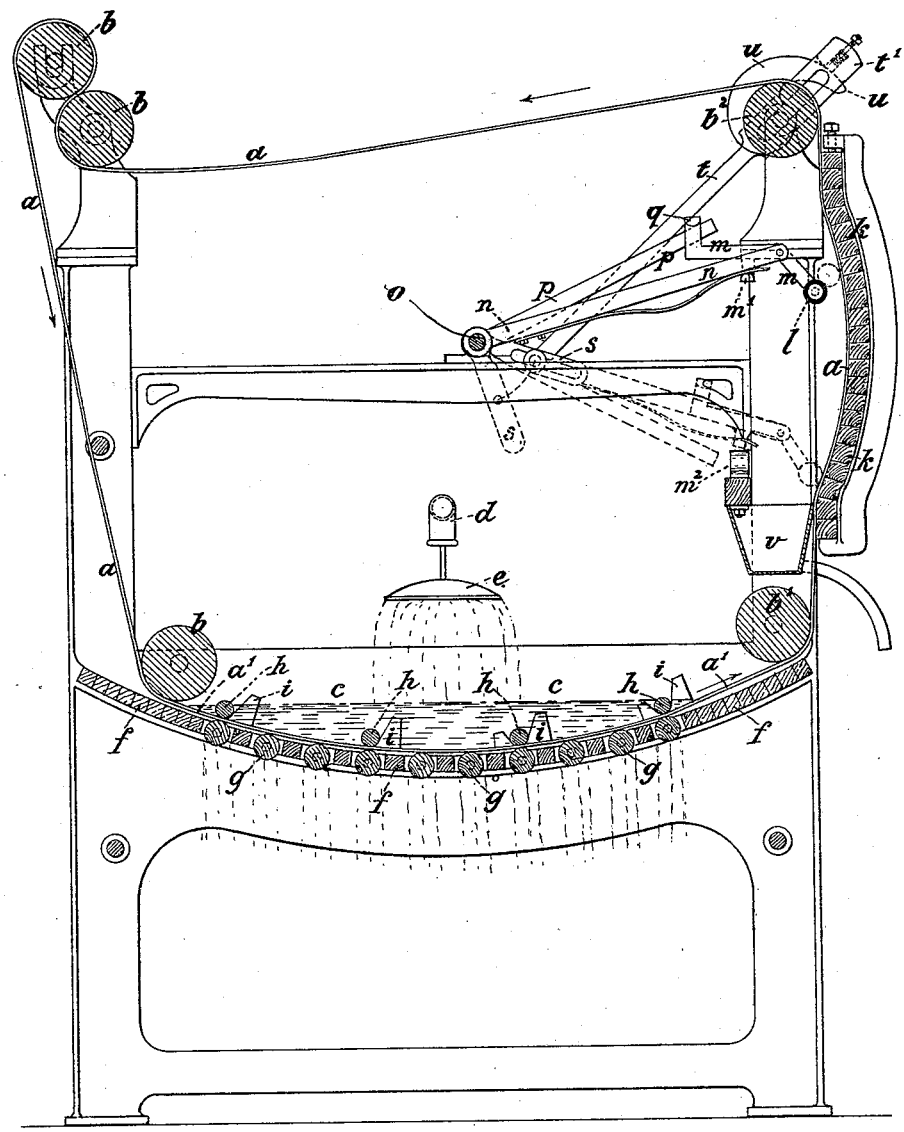
Witnesses.
John Revell
George Baumann
Inventor
William Birch
By his Attorneys
Howson & Howson.

UNITED STATES PATENT OFFICE.

WILLIAM BIRCH, OF MANCHESTER, ENGLAND.

FILTER.

SPECIFICATION forming part of Letters Patent No. 461,232, dated October 13, 1891.

Application filed September 15, 1890. Serial No. 365,062. (No model.) Patented in England March 26, 1890, No. 4,732; in Germany August 8, 1890, No 56,052; in France August 22, 1890, No. 207,788, and in Belgium August 23, 1890, No. 91,737.

*To all whom it may concern:*

Be it known that I, WILLIAM BIRCH, a subject of the Queen of Great Britain and Ireland, and residing at Lower Broughton, Manchester, in the county of Lancaster, England, have invented Improved Apparatus for Filtering Sewage and other Liquids, (for which I have obtained British Patent No. 4,732, dated March 26, 1890; French Patent No. 207,788, dated August 22, 1890; Belgian Patent No. 91,737, dated August 23, 1890, and German Patent No. 56,052, dated August 8, 1890,) of which the following is a specification.

The object of this invention is to construct a filter in such a way that the filtering-surface shall always be changing and shall be kept continuously clean.

The nature of my said invention and the manner in which the same is to be performed or carried into practical effect will be readily understood on reference to the drawing hereunto annexed and the following explanation thereof.

The drawing represents a vertical section illustrating the construction and application of the apparatus which constitutes my invention.

I propose to use an endless felt or filtering cloth or fabric $a$, which is kept in continuous or intermittent forward motion (in the direction shown by the arrows) by any convenient means and passes loosely round drawing and carrier rollers $b$ and dips into a trough or vessel $c$, into which the liquid to be filtered is admitted by a pipe $d$, preferably fitted with a spreader $e$. The lower hanging portion $a'$ of the felt or cloth dips below the liquid and lies upon the curved face of a perforated bed or grid $f$, which forms the bottom of the trough or vessel $c$, so that the liquid passes through the felt or cloth $a$ and through the perforations or openings in the curved grid or bottom $f$ into the space beneath. This space may be either open, as shown on the drawing, and a well, tank, or other open receptacle may be placed beneath, or it may be confined or closed and the filtered water may flow away or be drawn off therefrom in any convenient manner.

I prefer to fit the curved perforated bed or grid $f$ with rollers $g$, flush with the surface, (or the rollers $g$ may be so close together that they themselves form the bed or grid,) so as to facilitate the passing of the endless felt or cloth $a$ over the same, and to employ small metal rollers $h$ above the felt to keep it down against the bed or grid $f$, the ends of such rollers $h$ working against slides or inclines $i$, so that they can revolve with the felt or cloth without progressing and can readily be lifted out when required.

As the endless felt or cloth $a$ passes on either continuously or intermittently it carries with it out of the trough or vessel $c$ the solid refuse matter which the sewage or other water has precipitated or deposited thereon, together with a certain amount of water which the felt has absorbed, and before the felt passes over the top drawing or carrier rollers to enter again into the filtering trough or vessel $c$ it is necessary to cleanse the same from this solid precipitate or refuse, and the method of doing this forms an important feature of my invention. The felt or cloth $a$ after leaving the filtering trough or vessel $c$ passes over or against a fixed concave surface $k$; but I would here remark that, although preferable, it is not necessary that this surface should be concave nor that it should be fixed, as a convex or flat surface may be employed, or a slowly-revolving cylinder of large diameter may be substituted; but in either of these cases the movement of the cleansing apparatus hereinafter described will have to be employed accordingly. As the endless felt or cloth passes over this surface a traveling roller $l$ of small diameter is caused at intervals to press or squeeze the same with a rapid backward sweeping motion, accompanied by more or less pressure, so that the water in the felt is squeezed outward, and being at the same time rapidly urged backward carries all the deposit or refuse matter with it, leaving the felt or cloth clean.

The rapid backward sweeping motion of the small roller $l$ may be effected in a variety of ways without departing from the principal features of this method of cleansing; but for the sake of illustration I will here describe what I have found to be a convenient and effective arrangement of mechanism for that purpose.

I fix the concave surface $k$ in a perpendicular position just above the drawing or carrier roller $b'$, at the exit side of the filtering trough or vessel $c$, and I mount the small squeezing-roller $l$ on two levers $m$, (one at each end,) carried by radial arms $n$, loose on a shaft $o$, which corresponds with the center of the curve of the concave surface $k$.

On the same shaft $o$ are also fixed two other arms $p$, the ends of which act against projections $q$ on the ends of the levers $m$ farthest from the roller $l$. A spring $r$ is also provided on the arm or lever $n$, acting against the projection $m'$ on the lever $m$, so that the whole arrangement forms a sort of elbow-joint and $m$ acts as a rocking lever. $m^2$ is a spring or buffer to receive the weight of the levers $m$ and $n$ and break the shock of the fall. On the shaft $o$ are also fixed two short slotted levers $s$, to each of which is connected a rod $t$, having a projection $t'$ at the top, resting upon a snail-shaped cam $u$, which has a gradual rise and a sudden fall, and these two cams are mounted on the axis of one of the drawing-rollers $b^2$, so that as this roller revolves the cams revolve with it. When the piece $t'$ passes the point of the snail $u$, then $p$, $s$, and $t$ all fall together, and by their combined superior weight fall faster than the arm $n$, which is loose on the shaft $o$. As soon as the arm $p$ has fallen from the projection $q$ the spring $r$ expands and acting upon the projection $m'$ tilts over the lever $m$ before it allows $n$ to fall, so that the roller $l$ is pressed against the felt $a$, so as to squeeze the water, &c., out in descending. When $t$ begins to rise again on the snail $u$, the arm $p$ is raised up and, coming under $q$, causes $m$ to rock back, so as to bring $l$ away from the felt, and then the whole system rises up again together. It will thus be seen that the cleansing-roller $l$ is alternately carried upward at a little greater speed than the filtering cloth or felt $a$, and is then suddenly released and allowed to sweep rapidly backward over the surface of the felt into the position shown in dotted lines, driving before it the water and deposit or refuse, which falls into the trough or gutter $v$, arranged for that purpose, from whence it is drawn off or allowed to flow away.

In order to prevent the cleansing-roller $l$ from pressing against the surface of the felt or cloth $a$ as it rises up it is held in the position drawn in full lines by the projection $m'$ acting against the spring $r$, above named, causing the elbow-joint to give way as the levers or arms $p$ are raised up, but to stiffen and press the roller $l$ against the felt as it recedes downward, whereby the water is squeezed suddenly out of the felt and washes or swills away the deposit with it, and thus the filtering-cloth $a$ is effectually cleansed before passing again into the filtering trough or vessel $c$.

In some cases where the sewage or water contains straws or other matter which could not be swept away by the above arrangements I may employ a beater or beaters at the top of the apparatus to act upon the felt or cloth as it passes over the upper part, so as to loosen such straws or other similar matters and shake them off the surface onto a board or into a receptacle provided for that purpose.

I claim as my invention—

1. In a filtering apparatus, the combination of an endless filtering-cloth with a surface over which the cloth passes after leaving the filtering-tank, and a traveling roller arranged on the opposite side of the cloth, adapted to press the cloth against said surface as it moves in one direction and to move in the opposite direction free from said cloth, and suitable operating mechanism for producing the movements of said roller, as and for the purpose set forth.

2. A device for cleaning the endless traveling felt or cloth of a filtering apparatus, consisting of a resisting-surface, a roller, a shaft $o$, arms loose on the said shaft and provided with rocking levers carrying the said roller, a lever $p$, fixed to the shaft $o$ and engaging the working lever, a cam, and rods connected to the shaft $o$ and operated by the cam to move the said shaft in the manner and for the purposes specified.

3. A device for cleansing the endless traveling felt or cloth of a filtering apparatus, consisting of a resisting-surface, a roller, a shaft $o$, arms $n$, loose on the shaft, levers $m$, pivoted to the arms $n$, carrying the roller and provided with projections $m'$ and $q$, levers $p$, fixed to the shaft, engaging with the projections $q$, springs on the arms $n$, engaging with the projections $m'$, levers $s$, rods $t$, connected to the shaft $o$ through the levers $s$, and a rotating cam to actuate the said rods in the manner and for the purposes specified.

In testimony whereof I have signed my name to this specification in the presence of two subscribing witnesses.

WILLIAM BIRCH.

Witnesses:
CHARLES A. DAVIES,
JNO. HUGHES.